United States Patent
Seeliger et al.

(10) Patent No.: US 11,145,228 B1
(45) Date of Patent: Oct. 12, 2021

(54) IMMERSIVE DISPLAY STRUCTURE

(71) Applicant: Lockheed Martin Corporation, Bethesda, MD (US)

(72) Inventors: Jason Lee Seeliger, Orlando, FL (US); Steven P. Szaroletta, Orlando, FL (US); Tracy Alan Taylor, Orlando, FL (US); Matthew Wayne Dixon, Orlando, FL (US); John Michael Magda, Orlando, FL (US); Christopher Jon Shepp, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/092,103

(22) Filed: Nov. 6, 2020

(51) Int. Cl.
  *G09F 9/302* (2006.01)
  *G09G 3/00* (2006.01)
  *G06F 3/14* (2006.01)

(52) U.S. Cl.
  CPC .......... *G09F 9/3026* (2013.01); *G06F 3/1446* (2013.01); *G09G 3/03* (2020.08); *G09G 2300/026* (2013.01)

(58) Field of Classification Search
  CPC ..... H01H 13/70; G06F 3/03547; G06F 3/044; H03K 17/9622
  See application file for complete search history.

(56) References Cited

U.S. PATENT DOCUMENTS

| | | | |
|---|---|---|---|
| 5,911,024 A | 6/1999 | Wallace | |
| 6,814,578 B2* | 11/2004 | Vorst | G09B 9/326 345/1.1 |
| 7,663,793 B1 | 2/2010 | Doucet | |
| 8,587,497 B2 | 11/2013 | Streid et al. | |
| 2009/0066858 A1* | 3/2009 | Turner | H04N 9/3147 348/744 |
| 2012/0218170 A1* | 8/2012 | Streid | H04N 9/3147 345/1.3 |
| 2012/0249741 A1* | 10/2012 | Maciocci | G06T 15/503 348/46 |

* cited by examiner

*Primary Examiner* — Dennis P Joseph
(74) *Attorney, Agent, or Firm* — Foley & Lardner LLP

(57) ABSTRACT

This disclosure relates to apparatuses, systems, and methods for immersive display. A faceted geometric structure may have an axis and a perpendicular plane. Display panels may be arranged on a level of the plane radially about the axis and having a slope relative to the axis to define an opening of a first shape. Each display panel may have a second shape different from the first shape to provide a display to an interior of the structure. A display tile having the second shape may be mounted at the opening. A light relay having the first shape may be disposed within the opening. The light relay may receive a first output from the display tile corresponding to the second shape. The light relay may convert the first output to a second output to conform with the first shape. The light relay may provide the second output to the interior.

20 Claims, 11 Drawing Sheets

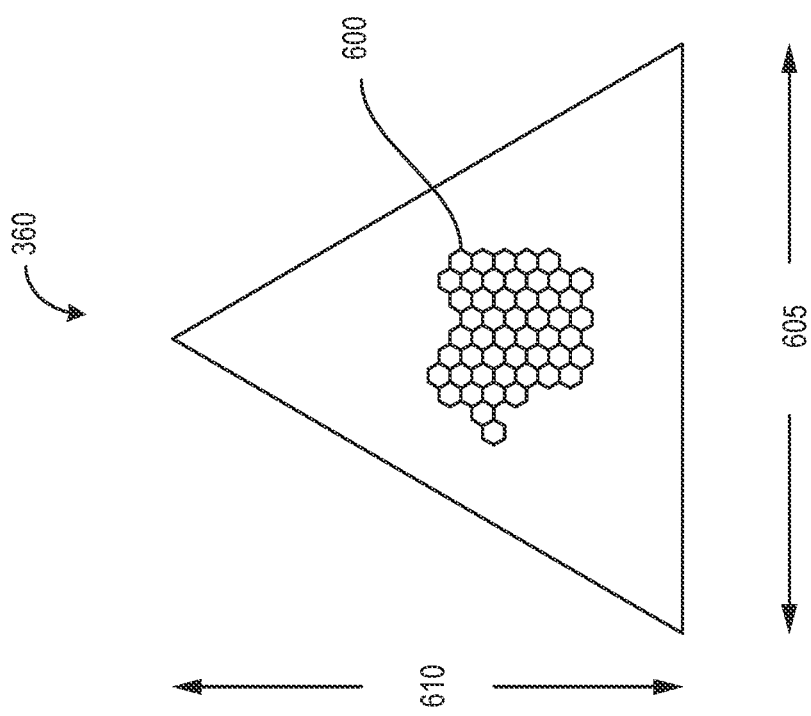

IMMERSIVE DISPLAY STRUCTURE

TECHNICAL FIELD

The present disclosure relates to display devices, and more generally, to direct projection immersive display structures.

BACKGROUND

A display device can receive an input in the form of electronic signals. Using the input, the display device can render a visual output for presentation.

SUMMARY

A dome-based structure may be used to create an immersive display for a viewer within the structure. Such an environment may have several applications that use high-resolution displays, such as flight simulation, virtual reality, or a planetarium projection, among others. One approach to achieving an immersive display may include using a set of display projectors (e.g., ten or more) each with a wide-angle lens and a set of mirrors (e.g., twenty or more) to project an image onto an interior surface of the structure. This structure, however, may consume a large amount of space or building footprint. Furthermore, this approach may limit the movement of the viewer as any obstruction between one of the projectors and the dome may result in a partial occlusion of the image. The placement of the display projectors and mirror arrays may be limited to achieve the throw distance requisites, with any deviation from the set locations potentially yielding an improperly projected image on the interior surface. Even when properly projected, images projected through a translucent screen (rear projected) or projected onto a screen and reflected to the observer (front projected) cannot rival the realism and quality, relative to direct projection display devices. Increasing the image quality in reflected or diffused imagery entails increased complexity and adds more unnatural elements, and with them image distortion, between the image source and the observer.

One approach to address the poor image quality from diffused or reflected imagery may be to use a multitude of displays arranged together in a dome-like shape (e.g., a polyhedron) to achieve the immersive display environment. The constituent, individual displays may be based on direct projection displays, such as microscopic light-emitting diode (micro-LED) or organic light-emitting diode (OLED) display technologies. The utilization of such technologies, however, may be challenged by the geometry for the immersive display environment. In particular, accounting for the dome-based structure may involve the use of customized display panels of various convex patterns (e.g., geodesic or latitude wedge-based shapes). The display panels of such shapes (e.g., triangular shape) may also call for the use of customized electronics drivers. Furthermore, aliased edges along the convex shape of the display panel may also create a distracting seam. The seam may be larger than the pixel pitch of the display panel for the edge seams along the diagonal, thereby resulting in undesirable display characteristics along the diagonal. Overall, the use of custom-tailored shapes for such display panels may also result in significant costs, entail greater consumption of time and materials in producing the panels. In addition, display panels of custom shapes may be plagued with obsolescence issues, and may lack future proofing design capabilities as display resolutions continuously increase. Replacement of display panels in an attempt to increase image quality may also bring about ever greater costs and consumption of resources.

To resolve these and other technical challenges with immersive display environments, a faceted geometric structure with rectangular facets may be used to leverage display panels of rectangular shapes combined with a fiber optic relay or face plates to fill in any gaps. The use of rectangular shapes for the display panels, as opposed to customized shapes, may remove or alleviate the consumption of time and materials in producing the panels and complexity in forming the structure. Moreover, the faceted geometric structure, such as a Rhombicuboctahedron, with a large number of rectangular facets within the shape may be used to form the dome-like structure for the immersive display environment. The rectangular facets may maximize the seams with an edge-on-edge alignment, while minimizing aliasing artifacts in comparison to more complex geometric shapes (e.g., triangular as discussed above, hexagonal, or edges), in which the seams form across a diagonal along the raster display. The edge-on-edge alignment may also allow for tighter seaming between the display panels, thereby providing a more complete immersive display environment. The immersive display may allow for use of commodity emissive display technologies combined in a geometry to form a concave surface with a small diopter variation, allowing the use of binocular augmented reality systems to be used in conjunction with the display.

Within the non-rectangular gaps or facets of the immersive display structure, a set of optical relays with various substrates (e.g., light guides, light relays, face plates,) may be used. In conjunction, the use of rectangular facets in the structure may minimize complexity of the structure and may increase the sustainability of such systems. The rectangular facet may also allow use of standard or commodity direct projection displays, such as micro-LED or OLED display technologies, to form the immersive display structure. The display structure can be assembled using standard, ubiquitous (and therefore low-cost) rectangular displays (e.g., computer monitors or flat panel televisions). Such rectangular displays may be more readily available and thus may be of lower cost and manufacturing complexity. On the other hand, triangular, octagon or hexagon displays format displays may not be commonplace, and may typically be custom designed and higher cost to manufacture due to the complexity due to the irregular shape.

Using light-pipes may enable relocating the pixels from a standard-format display to where they are to be used to create the immersive, seamless, distortion free environment. Rather than transmitting light rays through air and reflecting the rays off of or diffusing them through a surface, the light from the pixels may be coupled into a medium such as an optical fiber. The light may be carried to different "glass" before release to the user located at the display eye-point. This may save consumption of resources incurred from tailoring custom sizes and shapes for each specific display panel for the idiosyncratic requisites of other structures. In addition, the shape and alignment of the display panels may allow for diopter variation to be minimized. This minimal diopter variation of this arrangement may be compatible with transparent, binocular head-mounted display (HMD) in augmented reality use cases where the display system is augmented with a transparent HMD symbology overlay. Vergence of the HMD display plane and the emissive display may entail tighter tolerances to avoid double imaging while the user is within the interior of the structure.

As these rectangular display panels may be easily replaced and reduce frequency of maintenance, the immersive display structure may also have longer lifetimes and lower frequency of maintenance. For example, with projection screens fragile and easily scuffed, immersive display environments relying such projection screens may be difficult to maintain and may be costly to repair or replace. This may limit the mobility of a user within the environment (e.g., limited to chair and rails into and out of the dome). In contrast, immersive display environments with the faceted geometric shape that uses commodity, rectangular displays may be more easily maintained. Due to the regular rectangular shape of such displays, display components of the immersive display environment may be easily swapped and replaced. Furthermore, the faceted geometric structure may allow leveraging of commodity (or standard or common) rectangular OLED and Micro-LED display technologies without designing custom, convex-shaped panels. On the display panels, the pixels may be optimized resulting in little or no blend zones. With successive advancements to displays, the displays used in the immersive display environment may be readily removed and replaced with newer technology.

Reliance on such commonly available, rectangular display technology may increase the pixel utilization and may lower image generator performance prerequisites, relative to approaches that entail sets of lenses, mirrors, projectors and screens. In addition, a single piece of glass may be attached along the displays and the pixels may be placed onto the outside surface to form a dome, thereby creating a near-perfect, seamless image surface. In addition, the durability of the geometric faceted structure with the display panels may be significantly higher, compared to mirror and projector based systems. The self-contained direct projection may also eliminate requisites for dark rooms and curtain systems, while also maintaining image contrast and reducing facility footprint. Also, since these display panels do not occupy as much space as mirror arrays and projectors placed to accommodate long throw distances, the geometric faceted structure may also occupy less space than the structure for mirror arrays and projectors. Because sections of the display panels can be individually repaired without a teardown of the full system, the designing of complicated ingresses and egresses may be eliminated.

Additionally, the faceted geometric structure may allow use of display panels of common shapes to create a direct view out-of-the-window (OTW) display for various applications. For instance, such a configuration may lend well to flight simulator applications, with controlled diopter variation for binocular head-mounted display (HMD) computability via the geometry and fiber optic light relay face plates. Furthermore, the shape and technology may allow use of 1:1, 16:9, and 16:18 aspect ratio display panels such as OLED and Micro-LED panels, without customized compound curves or non-rectangular convex shapes. In addition, display radius can be easily increased or decreased to accommodate different simulator resolution requisites. The display radius can also be set to optimize procurement costs based on best value of pixel pitch to panel cost for different panel sizes. Moreover, the display radius can be easily increased or decreased to accommodate new display panel geometry (e.g., display panel size changes with resolution) allowing for future proof designs to be fitted. The design display panel facets may be used to decrease sparing requisites versus geodesic or latitude wedge based designs which entail multiple unique display facets. The rectangular panels may allow for active and passive pixel array drivers to be used, instead of custom pixel mapping or driver electronic circuitry to be developed as with convex facets for geodesic or other faceted dome shapes.

At least one aspect of this technical solution is directed to an apparatus for immersive display. The apparatus may include a faceted geometric structure having an axis and a plane perpendicular to the axis. The faceted geometric structure may include a level along the plane. The apparatus may include a plurality of display panels arranged on the level radially about the axis and having a slope relative to the axis to define an opening of a first shape. Each of the plurality of display panels may have a second shape different from the first shape to provide a display to an interior of the faceted geometric structure. The apparatus may include a display tile having the second shape and mounted at the opening. The apparatus may include a light relay having the first shape disposed within the opening. The light relay may receive a first output from the display tile corresponding to the second shape. The light relay may convert the first output of the second shape to a second output to conform with the first shape. The light relay may provide the second output for the display to the interior of the faceted geometric structure.

In some embodiments, the apparatus may include a second plurality of display panels that extend parallel along the axis arranged radially about the axis to at least partially enclose a second level different from the level in the faceted geometric structure. Each of the second plurality of display panels may have the first shape. In some embodiments, at least one of the second plurality of display panels may be mechanically coupled with an adjacent display panel of the second plurality of display panels to least partially conceal a screen bezel of the adjacent display panel. In some embodiments, at least one of the second plurality of display panels and a diagonally adjacent display panel of the plurality of display panels may partially define the opening.

In some embodiments, the display tile may include a surface mechanically coupled to an adjacent display panel of the plurality of display panels. In some embodiments, each of the plurality of display panels may include a driver board. The driver board may receive an input from a computing device for rendering the display. In some embodiments, each of the plurality of display panels may include a curved display surface. The curved display surface may have an edge to at least partially conceal a screen bezel of an adjacent display panel.

In some embodiments, the light relay may correct, based on the first shape and the second shape, an aspect of the first output rendered by the display tile. In some embodiments, the first shape of the light relay may correspond to a shape of a first facet of the faceted geometric structure. The second shape of each of the plurality of display panels may correspond to a shape of a second facet of the faceted geometric structure.

At least one aspect of the present disclosure is directed to a system for immersive display. The system may include a computing device having one or more processors coupled with memory. The system may include an immersive display structure communicatively coupled with the computing device. The immersive display structure may include a plurality of display panels arranged radially on a level about an axis of the immersive display structure and having a slope relative to the axis to define an opening of a first shape. Each of the plurality of display panels may have a second shape different from the first shape to provide a display to an interior of the immersive display structure. The immersive display structure may include a display tile having the second shape and mounted at the opening. The immersive display structure may include a light relay having the first shape disposed within the opening. The light relay may receive a first output from the display tile corresponding to the second shape. The light relay may convert the first output of the second shape to a second output to confirm with the first shape. The light relay may provide the second output for the display to the interior of the immersive display structure.

In some embodiments, the immersive display structure may include a second plurality of display panels that extend parallel along the axis arranged radially about the axis to at least partially enclose a second level different from the level in the immersive display structure. Each of the second plurality of display panels may have the first shape.

In some embodiments, each of the plurality of display panels may include a curved display surface. The curved display surface may have an edge to at least partially conceal a screen bezel of an adjacent display panel. In some embodiments, the light relay may correct, based on the first shape and the second shape, an aspect of the first output rendered by the display tile.

In some embodiments, the computing device is to provide a video input to each of the plurality of display panels. Each of the plurality of display panels may include a driver board, the driver board to render a video output using the video input received from the computing device. In some embodiments, the first shape of the display tile may be a triangular shape and the second shape of each of the plurality of display panels may be a rectangular shape.

At least one aspect of the present disclosure is directed to a method for immersive display. The method may include providing a faceted geometric structure having an axis and a plane perpendicular to the axis. The faceted geometric structure may include a level along the plane. The method may include arranging a plurality of display panels on the level radially about the axis and having a slope relative to the axis to define an opening of a first shape. Each of the plurality of display panels may have a second shape different from the first shape to provide a display to an interior of the faceted geometric structure. The method may include mounting, at the opening, a display tile having the second shape. The method may include disposing, within the opening, a light relay having the first shape. The light relay may receive a first output from the display tile corresponding to the second shape. The light relay may convert the first output of the second shape to a second output to confirm with the first shape. The light relay may provide the second output for the display to the interior of the faceted geometric structure.

In some embodiments, the method may include providing a second plurality of display panels that extend parallel along the axis arranged radially about the axis to at least partially enclose a second level different from the level in the faceted geometric structure. Each of the second plurality of display panels may have the first shape. In some embodiments, each of the plurality of display panels may include a driver board. The driver board may receive a video input from a computing device and to render a video output using the video input.

In some embodiments, the light relay may correct, based on the first shape and the second shape, an aspect of the first output rendered by the display tile. In some embodiments, the first shape of the light relay may correspond to a shape of a first facet of the faceted geometric structure. The second shape of each of the plurality of display panels may correspond to a shape of a second facet of the faceted geometric structure.

BRIEF DESCRIPTION OF THE DRAWINGS

FIG. 6A illustrates a frontal view of a light relay disposed in the faceted geometric structure in the system for immersive display in accordance with an illustrative embodiment FIG. 6B illustrates a side view of a light relay disposed in the faceted geometric structure in the system for immersive display in accordance with an illustrative embodiment;

DETAILED DESCRIPTION

Figure 1:
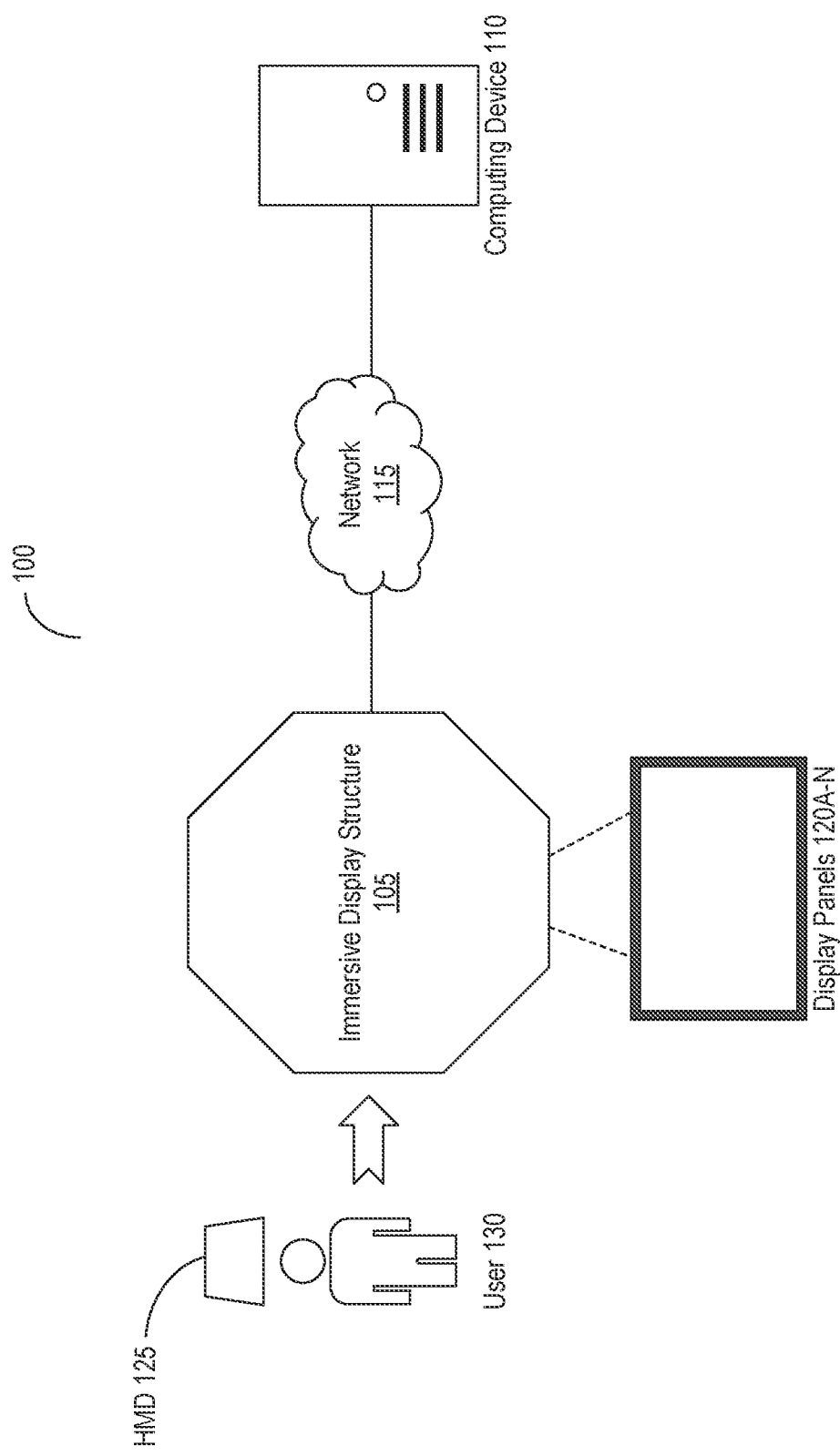
FIG. 1 illustrates a block diagram of a system for immersive display in accordance with an illustrative embodiment.

In the following detailed description, reference is made to the accompanying drawings, which form a part hereof. In the drawings, similar symbols typically identify similar components, unless context indicates otherwise. The illustrative implementations described in the detailed description, drawings, and claims are not meant to be limiting. Other implementations may be utilized, and other changes may be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

For purposes of reading the description of the various embodiments below, the following descriptions of the sections of the specification and their respective contents may be helpful:

Section A describes systems, apparatuses, and methods for immersive display structures; and Section B describes a computer system to be used in implementing various components described herein.

A. Immersive Display Structures

Referring now to FIG. 1, depicted is a block diagram of an environment or a system 100 for immersive display. In brief overview, the system 100 may include at least one immersive display structure 105, at least one computing device 110, at least one network 115, among others. The immersive display structure 105 (sometimes referred herein as a faceted geometric structure) may include a set of display panels 120A-N (hereinafter generally referred to as display panels 120). In some embodiments, the system 100 may include at least one head-mounted display (HMD) 125. The display panels 120 and the HMD 125 may be operated by or used by at least on user 130. The computing device 110, the display panels 120, and the HMD 125 may be connected or communicatively coupled with one another via the network 115. The computing device 110, the display panels 120, and the HMD 125 may be implemented using the components described herein in Section B.

Over the network 115, the computing device 110 may communicate with the display panels 120 of the immersive display structure 105 and the HMD 125. In communicating, the computing device 110 may send, transmit, or otherwise provide data to the display panel 120 and the HMD 125. The input data may include image to be rendered the display panels 120 of the immersive display structure 105 and the HMD 125 for presentation to the user 130. Using the data received from the computing device 110, each display panel 120 may generate a rendering of the image. The generation of the rendering may be performed without reliance on a specialized component. The HMD 125 may also generate a rendering of the image for presentation based on the data. In some embodiments, the HMD 125 may be a transparent binocular device, and the data for the HMD 125 may add to the image presented by the display panels 120 (e.g., via an overlay).

With the visual presentation by the set of display panels 120, the immersive display structure 105 may provide the user 130 a dome-based immersive display environment. The dome-based environment may be effectuated without the use of display projectors (e.g., a liquid-crystal display (LCD) projector or a digital light processing (DLP projector) or mirror arrays. Instead, the display panels 120 of the immersive display structure 105 may be a direct projection display device, such as a micro light-emitting diode (micro-LED) display or an organic light-emitting diode (OLED) display device, among others. In some embodiments, the immersive display structure 105 along with the set of display panels 120 and other input/output (I/O) devices can be used as a flight simulation system. The flight simulation system can be used to replicate environment and conditions of aircraft flight.

To experience the immersive display environment, the user 130 may enter an interior of the immersive display structure 105 via an ingress. In some cases, the user 130 may be wearing the HMD 125 while within the interior of the immersive display structure 105. The HMD 125 may augment the environment provided by the display panels 120 of the immersive display structure 105. The details regarding the arrangement and functionality of the immersive display structure 105 and the display panel 120 are provided herein below.

Figure 2:
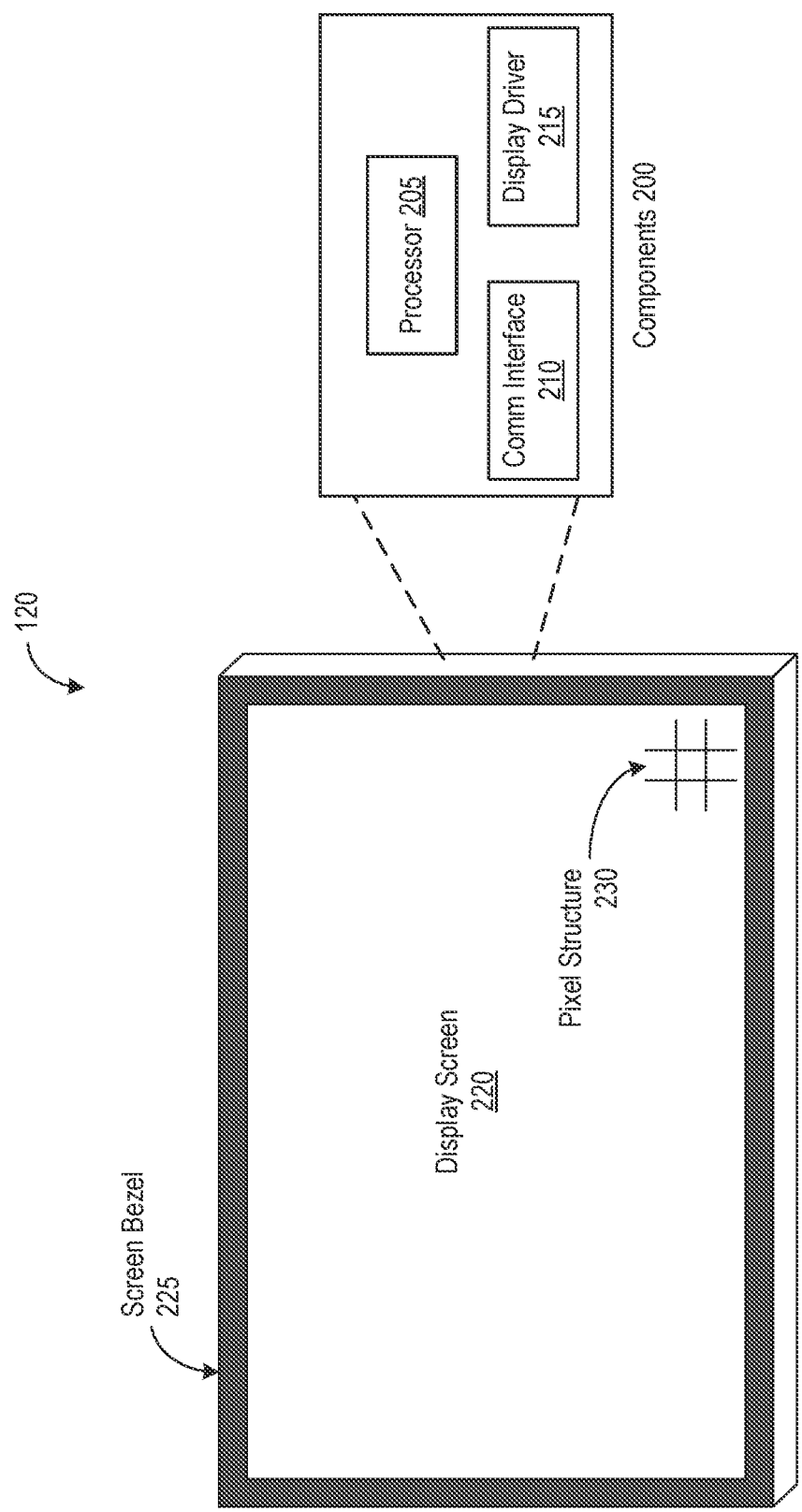
FIG. 2 illustrates a block diagram of a display panel in the system for immersive display in accordance with an illustrative embodiment.

Referring now to FIG. 2, depicted is a block diagram of one display panel 120 in the system 100 for immersive display. The display panel 120 may be a rectangular shape (e.g., a prism with a rectangular base as illustrated). For example, the display panel 120 may be a commodity, rectangular micro-LED or an OLED display device. The display panel 120 may have a height (or thickness) ranging between 1 to 5 inches, an width ranging between 20 to 80 inches, and an length ranging between 20 to 80 inches. For example, the ratio between a length and a width of the display panel 120 may be 16 to 9. In some embodiments, the display panels 120 may be placed relative to one another to form a shape approximating a square. For example, when two display panels 120 are placed side-by-side, the display ratio may be 16 to 18.

The display panel 120 may contain, house, or otherwise include one or more components 200. The components 200 may reside at least partially in an interior on the display panel 120. The components 200 may include at least one processor 205, at least one communication interface 210, and at least one display driver 215 (sometimes referred herein as a driver board), among others. The processor 205, the communication interface 210, and the display driver 215, and may be connected or communicatively coupled with one another. The communication interface 210 can be connected or communicatively coupled with the network 115 (and by extension, the computing device 110 and the HMD 125). The processor 205 may communicate to each pixel, for example, to control the color and intensity of the pixel, 60 to 120 times every second. The communication may be hub and spoke. For example, a trunk may carry all the traffic for a given area to that physically location and then spoke out to each pixel (e.g., each transistor node in the TFT array network).

Along an exterior, the display panel 120 may include at least one display screen 220 and at least one screen bezel 225 (sometimes referred herein as a monitor bezel), among others. The display screen 220 may be generally flat or level (e.g., as depicted) or curved (e.g., convex or concave). The display screen 220 may include at least one pixel structure 230. The pixel structure 230 may include a set of pixels arranged along the display screen 220. Within the pixel structure 230, the set of pixels may be arranged in a grid pattern (e.g., a rectangular or square grid pattern as depicted). The amount of pixels used to be projected into the interior of the immersive display structure may range between 80% to 100%. The screen bezel 225 may correspond to an area of the display panel 120 that envelopes, encloses, or otherwise surrounds the display screen 220 of the display panel 120. The screen bezel 225 may be situated or located on the same plane or side of the display panel 120 as the display screen 220. The screen bezel 225 may hold or secure the display screen 220 to the body of the display panel 120. In some embodiments, the overall display panel 120 (including the components 200 and the display screen 220) may be in accordance with a micro-LED or OLED display technology.

The processor 205 may include a microcontroller, a central processing unit (CPU), or a logic unit to control various operations of the display panel 120. The processor 205 may receive the data from the computing device 110 via the communication interface 210. The data may include or correspond to the image to be presented on the display panel 120 to an interior of the immersive display structure 105. The processor 205 may perform initial processing on the data prior to feeding the data to the display driver 215. The display driver 215 may receive the data from the processor 205. Upon receipt, the display driver 215 may generate the rendering of the image corresponding to the data for presentation via the display screen 220. The display driver 215 may format or convert the data to the rasterized image. In some embodiments, the display driver 215 may include a display controller and an array driver to process the data and generate a rendering of the image on the display screen 220 via the pixel structure 230. The display driver 215 may translate or map portions of the rasterized image to corresponding pixels in the pixel structure 230 of the display screen 220.

Figure 3A:
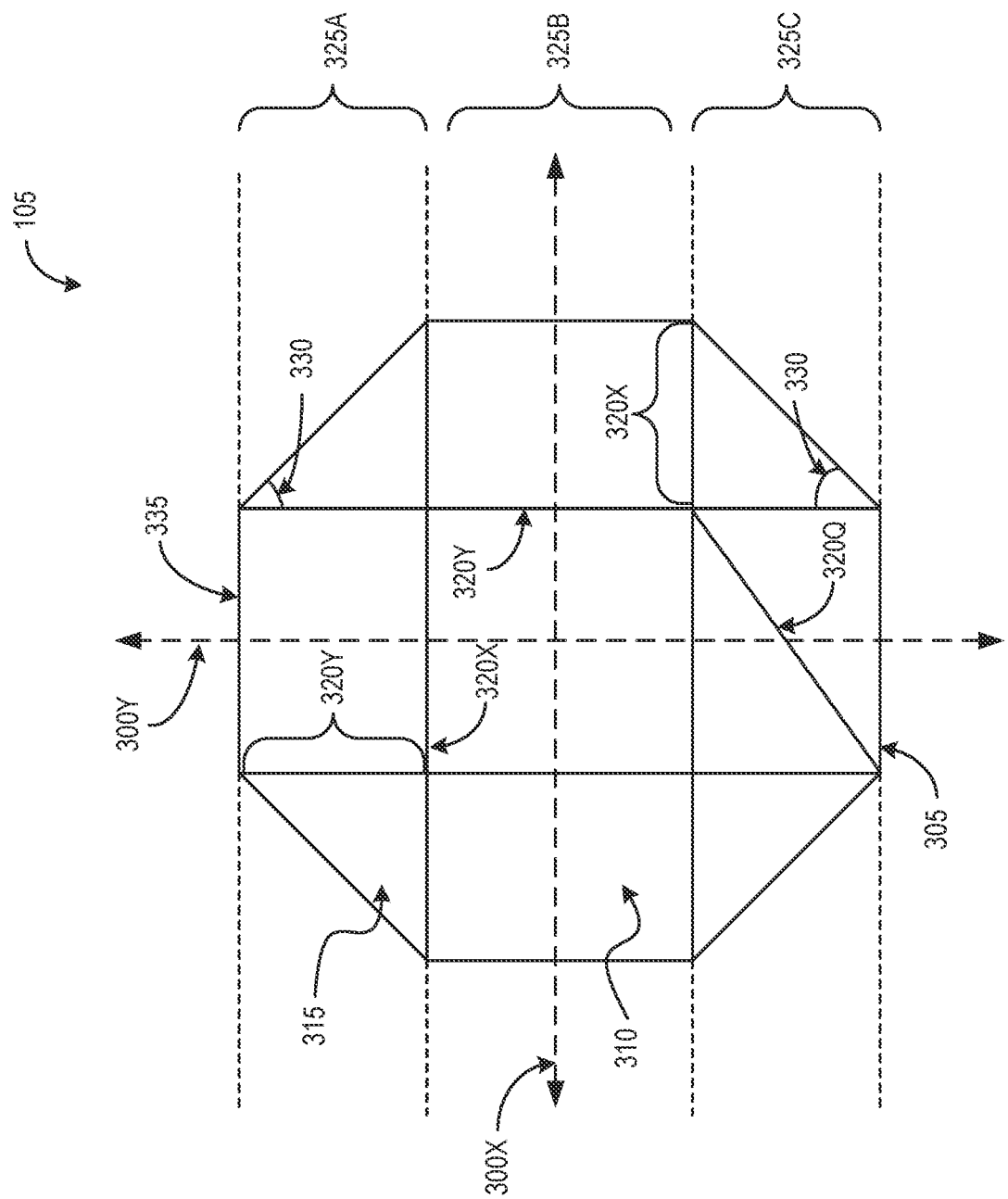
FIG. 3A illustrates a cross-sectional view of a faceted geometric structure in the system for immersive display in accordance with an illustrative embodiment.

Referring now to FIG. 3A, depicted is a cross-sectional view of the immersive display structure 105 in the system 100 for immersive display. The immersive display structure 105 may be of a faceted geometric shape. To define the shape, the immersive display structure 105 may have a lateral axis 300X (sometimes referred herein as a transverse axis) and a vertical axis 300Y (sometimes referred herein as a normal axis). The lateral axis 300X may extend or span parallel or substantially parallel (e.g., within 15% deviation)

to a base 305 of the immersive display structure 105. The base 305 may correspond to a facet of the immersive display structure 105 that is supported by a surface (e.g., a ground or floor) of the environment in which the immersive display structure 105 is situated. The vertical axis 300Y may extend or span perpendicular or substantially perpendicular (e.g., within 15% deviation) to the base 305 of the immersive display structure 105. The geometries and components of the immersive display structure 105 may be defined, oriented, or positioned relative to the lateral axis 300X and the vertical axis 300Y. The lateral axis 300X and the vertical axis 300Y may be perpendicular or substantially perpendicular (e.g., within 15% deviation) to each other. The lateral axis 300X may be perpendicular or substantially perpendicular (e.g., within 15% deviation) to a vertical plane defined by the vertical axis 300Y. Likewise, the vertical axis 300Y may be perpendicular or substantially perpendicular (e.g., within 15% deviation) to a horizontal plane defined by the lateral axis 300X.

The geometry of the immersive display structure 105 may be a set of copulae or a section of the set of copulae. For example, the copulae for the geometry of the immersive display structure 105 may include a rhombicuboctahedron (e.g., as depicted in cross-section), cuboctahedron, rhombicosidodecahedron, a triangular orthobicupola, a square orthobicupola, a square gyrobicupola, gyrobifastigium, pentangonal gyrobicupola, and gyroelongated square bicupola, among others. In general, the immersive display structure 105 may include facets (sometimes referred to as surfaces or faces), such as a set of rectangular facets 310 and a set of triangular facets 315, among others. The shape for the rectangular facets 310 may be a square or a rectangle. The shape for the triangular facets 315 may be triangular (e.g., as depicted). Other shapes may be used instead of the triangular shape of the triangular facet 315, such as pentagonal, and hexagonal, among others. In the geometry of the immersive display structure 105, the set of rectangular facets 310 and the set of triangular facets 315 may be attached or alternating with one another. The immersive display structure 105 may have an overall height ranging between 8 to 20 feet, an overall width ranging between 8 to 20 feet, and an overall length ranging between 8 to 20 feet. Other dimensions may be used for the immersive display structure 105 in accordance to various target performance specifications. For example, the specifications may be 4 arc minutes per optical line pair (or 0.06667 degrees) for the resolution of the display panels 120 included in the immersive display structure 105. If the display panel 120 has a 0.6 mm pixel pitch, the minimum distance may be 515 mm between the eyes of the user 130 and the display panel 120. With two display panels 120 placed side-by-side, the distance may be 1.7 m. Using the specified minimum distance, the dimensions of the immersive display structure 105 may be set and configured.

The immersive display structure 105 may have a set of lattices, such as a set of horizontal lattices 320X, a set of vertical lattices 320Y, and at least one oblique lattice 320Q (hereinafter generally referred to as lattices 320 as depicted). The set of horizontal lattices 320X and the set of vertical lattices 320Y may be arranged in the immersive display structure 105 to form the faceted geometry shape, such as the rectangular facets 310 and the triangular facets 315. The oblique lattices 320Q in the immersive display structure 105 may be arranged to join, link, or interconnect the set of horizontal lattices 320X or the set of vertical lattices 320Y with one another. In the immersive display structure 105, the set of horizontal lattices 320X may span or extend parallel or substantially parallel (e.g., within 15% deviation) relative to the lateral axis 300X. At least some of the set of vertical lattices 320Y may span or extend parallel or substantially perpendicular (e.g., within 15% deviation) relative to the lateral axis 300X. The oblique lattices 320Q may extend or span in an oblique orientation relative to the lateral axis 300X or the vertical axis 300Y.

Each of the lattices 320 may include a structural element to support or carry the components (e.g., the display panels 120) of the immersive display structure 105. The structural elements used for the lattices 320 may include a compression member (e.g., a column or strut), a, a rod (e.g., a cylindrical rod or a tie rod), a support beam (e.g., a collar beam, a flitch beam, or a tie beam), a tie (e.g., wire rope or tension wire), among others. The structural elements of the lattices 320 may, for example, form a truss structure for the immersive display structure 105. The dimensions of the structural element of each lattice 320 may depend on the performance specifications, such as resolution, diopter variation, and minimum distance between the user 130 and the display panel 120. The structural element of each lattice 320 may have a height (or thickness) ranging between 1 to 20 inches, a width ranging between 10 to 90 inches, and an length ranging between 10 to 90 inches.

The immersive display structure 105 may have or may be divided into a set of levels 325A-N (sometimes referred herein as layers or sections). In the example depicted, the immersive display structure 105 may have three levels: a top level 325A, a median level 325B, and a bottom level 325C (hereinafter generally referred to as level 325) from top to bottom of the immersive display structure 105. Each level 325 may correspond to a section of the faceted geometric shape for the immersive display structure 105. Each level 325 may be along the plane defined by the lateral axis 300X. A upper edge of the top level 325A may be defined by a ceiling 335. The ceiling 335 may correspond to the rectangular facet 310 on the top of the immersive display structure 105. The ceiling 335 may be parallel or substantially parallel (e.g., within 15% deviation) to the lateral axis 300X or the base 305. A lower edge of the bottom level 325C may be defined by the base 305. The dimensions of each level 325 may depend on the performance specifications, such as resolution, diopter variation, and minimum distance between the user 130 and the display panel 120. Each level 325 may have a height ranging between 1 to 20 inches, a width ranging between 10 to 90 inches, and an length ranging between 10 to 90 inches.

Each level 325 may include one or more lattices 320, such as the horizontal lattices 320X, vertical lattices 320Y, and the oblique lattices 320Q. In some embodiments, each level 325 may be defined relative to the horizontal lattices 320X. In the illustrated example, the top layer 325A and the median layer 325B may be defined by a set of horizontal lattices 320X as a boundary spanning between the two levels 325. In the top level 325A and the bottom level 325C, each of the vertical lattices 320Y may have or may be at a slope 330 relative to the vertical axis 300Y. The slope 330 may depend on the performance specifications, such as resolution, diopter variation, and minimum distance between the user 130 and the display panel 120. The slope 330 may be derived from the dimensions of the immersive display structure 105, and may range between 5 to 85 degrees relative to the vertical axis 300Y. The slope 330 of the vertical lattices 320Y in the top level 325A and the bottom level 325C may at least partially define the triangular facets 315.

Figure 3B:
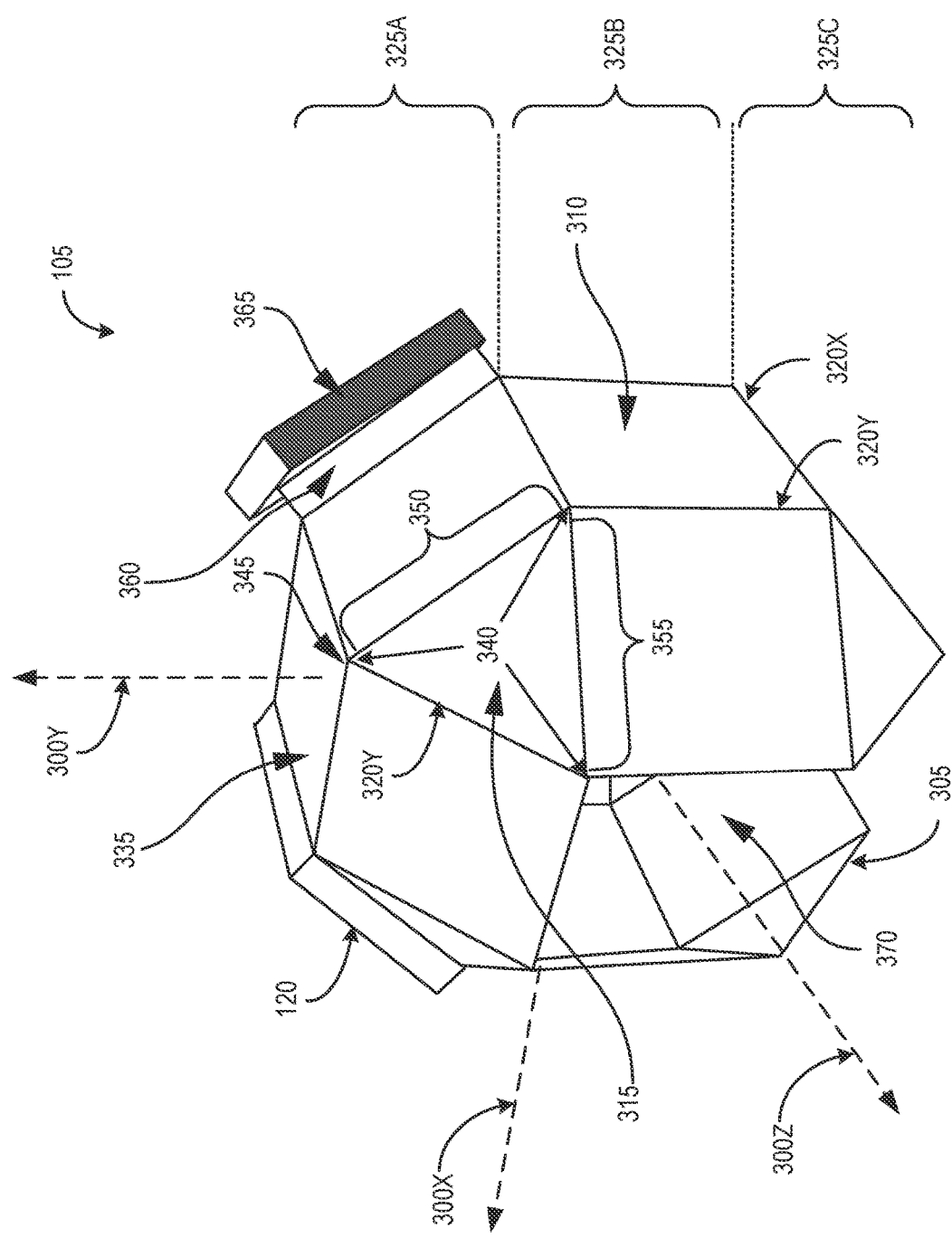
FIG. 3B illustrates an axonometric view of a faceted geometric structure in the system for immersive display in accordance with an illustrative embodiment.

Referring now to FIG. 3B, depicted is an axonometric view of the immersive display structure 105 in the system 100 for immersive display. As illustrated, the immersive display structure 105 may also include a longitudinal axis 300Z (sometimes referred herein as a sagittal axis). The longitudinal axis 300Z may extend or span parallel or substantially parallel (e.g., within 15% deviation) to the base 305 of the immersive display structure 105. The geometries and components of the immersive display structure 105 may be defined, oriented, or positioned relative to the longitudinal axis 300Z. The lateral axis 300X, the vertical axis 300Y, and the longitudinal axis 300Z may be orthogonal or substantially perpendicular (e.g., within 15% deviation) to one another. The longitudinal axis 300Z may be perpendicular or substantially perpendicular (e.g., within 15% deviation) to a vertical plane defined by the vertical axis 300Y, and vice-versa.

On each rectangular facet 310, the immersive display structure 105 may have at least one display panel 120 (e.g., as depicted towards the upper left in the illustration). At least one display panel 120 may be mounted, fastened, or otherwise held in each rectangular facet 310 by the lattices 320 (e.g., using the structural element) defining the rectangular facet 310. In some embodiments, each display panel 120 may be removably mounted, fastened, or otherwise coupled to the rectangular facet 310 (e.g., to allow for rapid replacement and insertion of a new display panel 120). In each level 325, the set of display panels 120 may be disposed or arranged radially about the vertical axis 300Y. Each display panel 120 may provide a display to an interior of the immersive display structure 105. To provide the display, the display screen 220 of each display panel 120 may face or be oriented toward the interior of the immersive display structure.

In the median level 325B, each display panels 120 may extend or span the immersive display structure 105 parallel or substantially parallel (e.g., within 15% deviation) relative to the vertical axis 300Y. The display panels 120 of the median level 325B may also be arranged radially about the vertical axis 300Y. Arranged radially, the display panels 120 of the median level 325B may at least partially surround or enclose the median level 325B. Each display panels 120 placed or situated in the median level 325B may be connected, joined, or otherwise mechanically coupled with at least one other display panel 120 along an edge corresponding to a respective vertical lattice 320Y. Coupled with one another, the display panel 120 may at least partially overlap, hide, or conceal the screen bezel 225 of an adjacent display panel 120 of the median level 325B. With the concealment of the screen bezels 225, the display screens 220 of the display panels 120 may at least partially be adjacent or connected to one another.

In the top level 325A and the bottom level 325C, each display panel 120 may extend or span the immersive display structure 105 obliquely along the slope 330 relative to the vertical axis 300Y. The display panels 120 of the top level 325A and the bottom level 325C may be arranged radially about the vertical axis 300Y. Each display panel 120 of the top level 325A and the bottom level 325C may be oriented at or otherwise have the slope 330 relative to the vertical axis 300Y. Oriented at the slope 330, the display panels 120 on the top level 325A and the bottom level 325C may define openings 340 corresponding to the triangular facets 315 on the respective top level 325A and bottom level 325C. Each display panel 120 of the top level 325A and the bottom level 325C may be connected, joined, or otherwise mechanically coupled with at least one other display panel 120 along at least one point 345 of the point of the horizontal lattice 320X or the vertical lattice 320Y.

Furthermore, the display panels 120 of the top level 325A and the bottom level 325C may be connected, joined, or otherwise mechanically coupled with the display panels 120 of the median level 325B along an edge corresponding to a respective horizontal lattices 320X. Coupled with one another, the display panel 120 of the top level 325A or the bottom level 325C may at least partially overlap, hide, or conceal the screen bezel 225 of an adjacent display panel 120 of the median level 325B. With the concealment of the screen bezels 225, the display screens 220 of the display panels 120 may at least partially be adjacent or connected to one another across the different levels 325. As the screen bezels 225 may be out of view from the perspective of the user 130 situated within, the overall display provided by the display panels 120 of the immersive display structure 105 may appear seamless.

On each triangular facet 315, the immersive display structure 105 may have or define the at least one opening 340. The shape of the opening 340 may correspond to the triangular facet 315, and may differ from the rectangular shape of the rectangular facets 310 and by extension the shape of each display panel 120. The opening 340 may also be oriented or may have the slope 330 relative to the vertical axis 300Y. The opening 340 may be defined by at least two vertical lattices 320Y of the top level 325A (e.g., in focus in the illustrated) or the bottom level 325C and by one of the horizontal lattices 320X (e.g., between the top level 325A and the median level 325B as depicted). With respect to the display panels 120, the opening 340 may be partially defined by at least one edge 350 of at least two display panels 120 in the top level 325A (e.g., as depicted) or the bottom level 325C. The edge 350 may correspond to a vertical lattice 320Y spanning from the ceiling 335 to the median level 325B through the top level 325A. The opening 340 may be partially defined by at least one edge 355 of at least one display panel 120 in the median level 325B. The edge 355 may correspond to a horizontal lattice 320X defining the boundary between the top level 325A (e.g., as depicted) or the bottom level 325C with the median level 325B.

Within each opening 340, the immersive display structure 105 may include at least one light relay 360. The light relay 360 may be a passive optical component to direct or pass light from one face to another face (e.g., from an exterior face to an interior face). The light relay 360 may be inserted, situated, or otherwise arranged at least partially within the opening 340 in the top level 325A or the bottom level 325C. Each light relay 360 may be connected, joined, or otherwise mechanically coupled with the display panels 120 on adjacent levels 325 (e.g., the top level 325A and the median level 325B as depicted). To connect, the light relay 360 may be mechanically coupled with the adjacent display panels 120 on the same level 325 (e.g., the top level 325A as depicted or the bottom level 325C) via the vertical lattice 320Y corresponding to the edge 350. In addition, the light relay 360 may be mechanically coupled with the at least one display 120 of the median level 325C via the horizontal lattice 320X corresponding to the edge 355. In some embodiments, the light relay 360 may at least partially overlap, hide, or conceal the screen bezel 225 of the adjacent display panels 120 on the same level 325 or the median level 325B.

In addition, the immersive display structure 105 may include at least one display tile 365 (sometimes referred herein as an optical relay or a light baffle) around or at each opening 340. The display tile 365 may be another instance of the display panel 120, and may include the components 200, the display screen 220, and the screen bezel 225. In some embodiments, the display tile 365 may have the same shape and the same dimensions as the display panel 120. In some embodiments, the display tile 365 may have the same shape but different dimensions from the display panel 120. The display tile 365 may have a height ranging between 1 to 5 inches, an width ranging between 20 to 80 inches, and an length ranging between 20 to 80 inches. For example, the ratio between a length and a width of the display tile 365 may be 16 to 9. The display tile 365 may be attached, situated, or otherwise mounted at the opening 340. In some embodiments, the display tile 365 may be removably coupled, attached, or mounted at the opening 340 (e.g., to allow for rapid replacement and insertion of a new display tile 365). The display tile 365 may be disposed or arranged on the exterior face of the light relay 360 that is disposed within the opening 340.

The display screen 220 of the display tile 365 may be flush with, connected to, or otherwise mechanically coupled with the exterior face of the light relay 360 to provide the display to the interior of the immersive display structure 105. In some embodiments, a dielectric material (e.g., a coating, film, or oil) may be situated between the exterior face of the light relay 360 and the display screen 220 of the display tile 365. The screen bezel 225 of the display tile 365 may be separated from or may not be in contact with the light relay 360. Via the light relay 360, the display screen 220 of the display tile 365 may be mechanically coupled with the adjacent display panels 120 on the same level 325 (e.g., the top level 325A as depicted or the bottom level 325C) via the vertical lattice 320Y corresponding to the edge 350. In addition, the light relay 360 may be mechanically coupled with the at least one display 120 of the median level 325C via the horizontal lattice 320X corresponding to the edge 355. As the screen bezel 225 of the display tile 365 may be out of view from the perspective of the user 130 situated within, the display provided by the display tile 365 in conjunction with the display panels 120 of the immersive display structure 105 may appear seamless. In some embodiments, at least a portion of the display screen 220 of the display tile 365 may be outside the view.

As a passive optical component, the light relay 360 may direct or pass light from the exterior face to the interior face to illuminate the interior of the immersive display structure 105. The light relay 360 may accept, collect, or otherwise receive an output from the display tile 365 mounted to the same opening 340 as the light relay 360. The output may be rendered via the display screen 220 of the display tile 220. In some embodiments, the output may be of a rectangular shape as the shape of the display screen 220. In some embodiments, the output from the display tile 365 may be of the same shape as the triangular facet 315 an by extension the light relay 360. In some embodiments, the input provided by the computing device 110 to the display tile 365 may be to render the output of the same shape as the triangular facet 315, as opposed to the rectangular facet 310 for the other display panels 120.

By passing the output from the display tile 365 thru the light relay 360, this may move display tile pixels selectively in only the areas where the light rely intersects the display panel. This property may be used to fill a desired shape or gap presented with faceted geometries and aspect ratios. The objective of the light relay 360 may be to relocate the output light corresponding to the pixels passed from the display tile 365 and maintain the intensity of the light by minimizing dispersion. In some embodiments, the light relay 360 may convert the output from the original shape (e.g., rectangular) and the shape of the light relay 360 (e.g., triangular). In converting, the light relay 360 may adjust, modify, or otherwise correct the output from the display screen 220 of the display tile 365 for an aspect ratio. The aspect ratio may define a ratio of the width and the height of the output, and the output target aspect ratio for the light relay 360 may be, for example, 8 to 5, 16 to 10, 1.6 to 1, 16 to 9, among others. As the output image passes through the light relay 360, the output may be converted to the target aspect ratio and resolution. The light relay 360 may produce, output, or otherwise provide the converted output for display to the interior of the immersive display structure 105. The light relay 360 may capture emissions off the pixel such that very little light is lost. In some embodiments, the light relay 360 may also adjust an intensity of each pixel passed from the display tile 365.

Along at least one side, the immersive display structure 105 may have or define at least one entrance 370 (sometimes referred herein as an ingress or egress). The entrance 370 may correspond to an opening through which the user 130 can enter or exit the interior of the immersive display structure 105. In some embodiments, a movable barrier (e.g., a hinged door, a folding door, or a sliding door) may be situated within the entrance 370 to restrict or prevent exterior light from entering the interior of the immersive display structure 105. The entrance 370 can span at least partially through one or more levels 325 (e.g., the median level 325B and the bottom level 325C as depicted). The entrance 370 may have a height ranging between 4 to 10 feet and a width ranging between 3 to 6 feet.

Figure 4:
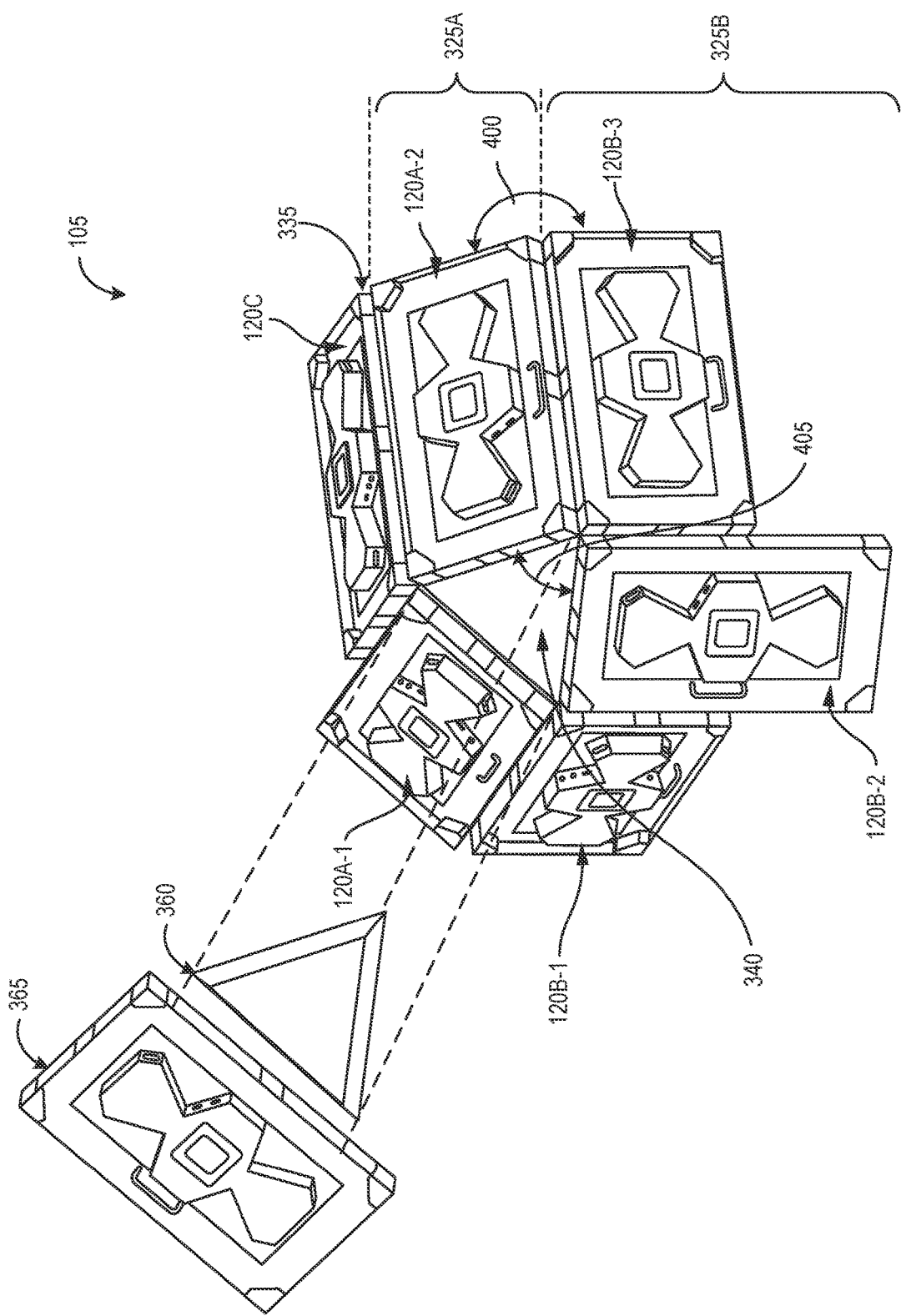
FIG. 4 illustrates an exploded, axonometric view about an opening of the faceted geometric structure in the system for immersive display in accordance with an illustrative embodiment.

Referring now to FIG. 4, depicted is an exploded, axonometric view about the opening 340 of the immersive display structure 105 in the system 100 for immersive display. As illustrated, on the top level 325A, the immersive display structure 105 may include the display panels 120A-1 and 120A-2 oriented at the slope 330 about the vertical axis 300Y to partially define the opening 340. On the median level 325B, the immersive display structure 105 may include the display panels 120B-1, 120B-2, and 120B-3 radially about the vertical axis 300Y. The immersive display structure 105 may also include at least one display panel 120C in the ceiling 335 of the immersive display structure 105. Between the top level 325A and the median level 325B, at least some of the display panels 120 may be arranged in a direct adjacency 400. For example, the display panel 120A-2 of the top level 325A may be directly adjacent 400 to the display panel 120B-3 of the median level 325B. In addition, at least one display panel 120 of the top level 325A and at least one display panel 120 of the median level 325B may be in diagonal adjacency 405 to define the opening 340. Within the opening 340 defined by the diagonally adjacent display panels 120 across the two levels, the light relay 360 may be disposed. At the opening 340, the display panel 365 may be mounted on the exterior face of the light relay 360.

Figure 5A:
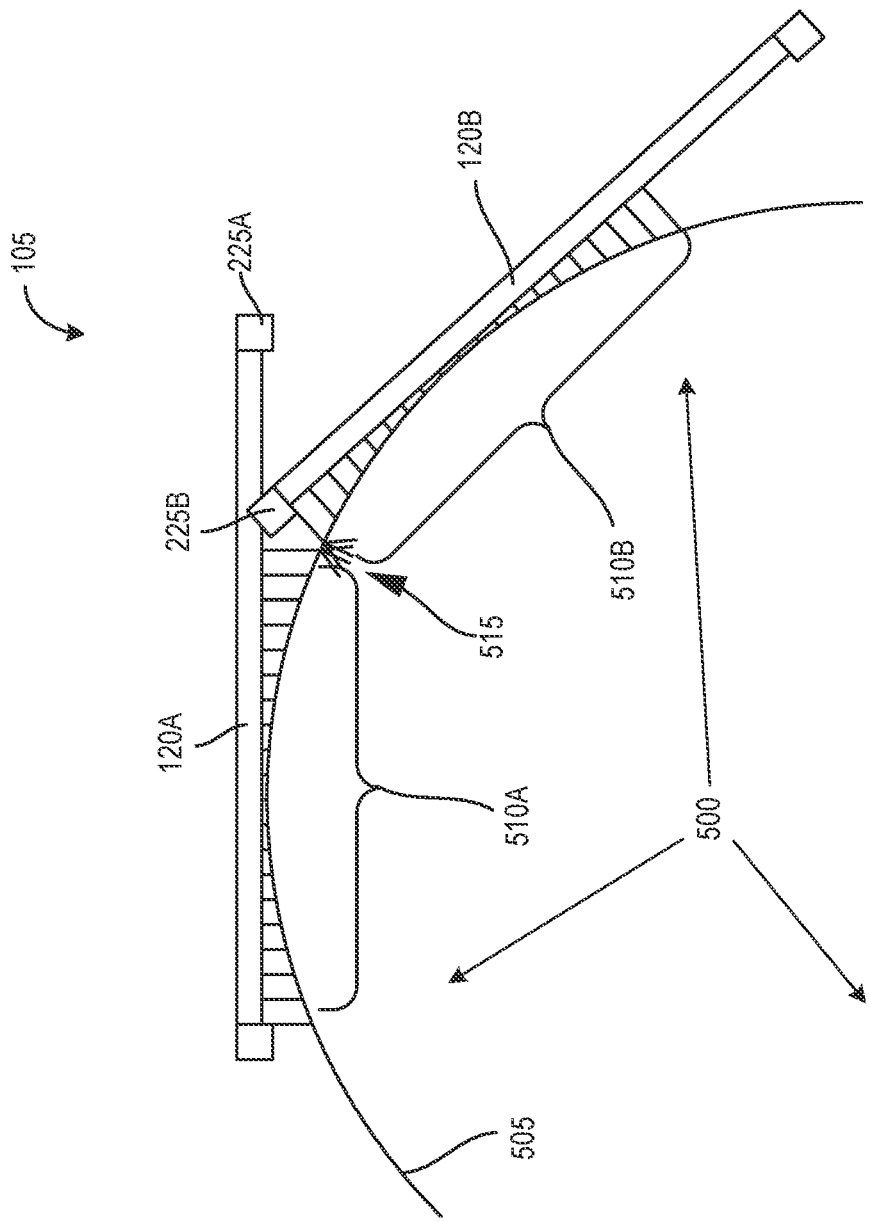
FIGS. 5A-C each illustrate an overhead cross-sectional view of the plurality of display panels arranged in the faceted geometric structure in the system for immersive display in accordance with an illustrative embodiment.

Referring now to FIG. 5A, depicted is an overhead cross-sectional view of the display panels 120 arranged in the immersive display structure 105 in the system 100 for immersive display. The immersive display structure 105 may define or have an interior 500. The interior 500 may correspond to the volume within the immersive display structure 105. Within the interior 500, the immersive display structure 105 may have or may define a curved display 505. The curved display 505 may form a concave surface (e.g., a dome) within the interior 500 of the immersive display structure 105. The concave surface defined by the curved display 505 may have a radius ranging between 4 to 10 feet on the vertical axis 300Y, a radius between 4 to 10 feet on along the lateral axis 300X, and a radius between 4 to 10 feet on along the longitudinal axis 300Z.

To define the curved display 505, each display screen 220 of the display panels 120 of the immersive display structure 105 may be fitted, flush, or otherwise mechanically coupled with a curved display panel. For example, as depicted, each display panel 120A and 120B may include the curved fiber panels 510A and 510B (hereinafter generally referred to as a curved fiber panel 510). Each curved fiber panel 510 may be attached, connected, or otherwise mounted to the display screen 220 of the display panel 120. In some embodiments, at least one of the curved fiber panels 510 may be mounted to the light relay 360. The curved fiber panels 510 of adjacent display panels 120 may have at least one common edge 515 to at least partially hide, overlap, or conceal at least one of the screen bezel 225. In the example depicted, the edge 515 may conceal screen bezel 225B. Each curved fiber panel 510 may be a passive optical component (e.g., similar to the light relay 360) include or may be a set of optical fibers. Each fiber may of the curved fiber panel 510 may have a length set to match the curvature of the curved display 500. The length of each fiber in the curved fiber panel 510 may range between ⅛ to 4 inches. The set of optical fibers across the curved fiber panels 510 may be used to reduce or eliminate diopter variation. With the reduction or elimination of diopter variation, the HMD 125 (e.g., binocular HMD) may be used to view the overall display outputted by the display panel 120.

The display panel 120 and the display tile 365 may maintain a vergence tolerance of the HMD 125 for augmented reality applications (e.g., to reduce or avoid strain on the visual sensory system of the user 130). The HMD 125 may have a diopter variation of less than 0.1 diopters. The vergence tolerance may refer to a simultaneous movement of eyes (e.g., of the user 130) in opposite directions when viewing the display provided by the immersive display structure 105 through the HMD 125. The diopter variation of the HMD 125 may be set to less than 0.1 diopters to avoid double imaging, in which the user 130 is forced to focus on the HDM 125 symbology overlaid on the display provided by the immersive display structure 105. If the diopter variation is too large, the vergence of the eyes of the user 130 may be forced to change when viewing the symbology on the HMD 125 or the symbology on the immersive display structure 105. The change in vergence may lead to eye fatigue. To avoid the large changes in vergence and eye fatigue on the part of the user 130, the diopter variation on the HMD 125 may be configured to be less than 0.1 diopters.

Figure 5B:
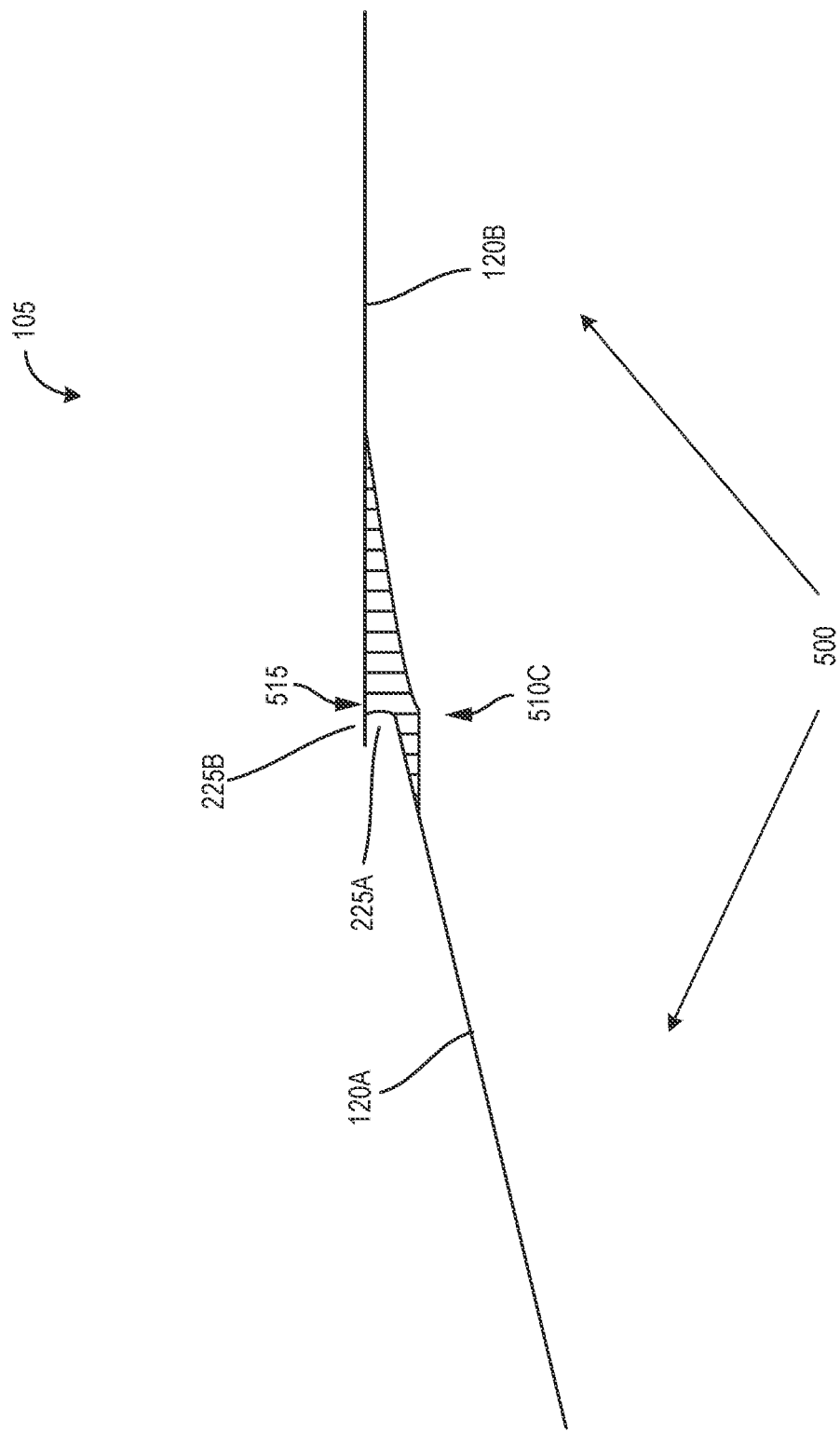

Referring now to FIG. 5B, depicted is another overhead cross-sectional view of the display panels 120 arranged in the immersive display structure 105 in the system 100 for immersive display. The immersive display structure 105 may include at least one curved fiber panel 510 (e.g., the curved display panel 510C as depicted) to hide or conceal the screen bezels 225 of adjacent display panels 120 (e.g., the display panels 120A and 120B). In the example depicted, the screen bezel 225A of the display panel 120A may overlap the screen bezel 225B of the display panel 120B, and may be visible from within the interior 500. To conceal the screen bezel 225, the curved fiber panel 510 may be attached, connected, or otherwise mounted between the display screens 220 of the display panels 120 along the edge 515. The optical fibers of the curved fiber panel 510 may have length set to conceal the screen bezels 225 along the common edge 515. The length of each fiber in the curved fiber panel 510 may range between ⅛ to 4 inches.

Figure 5C:
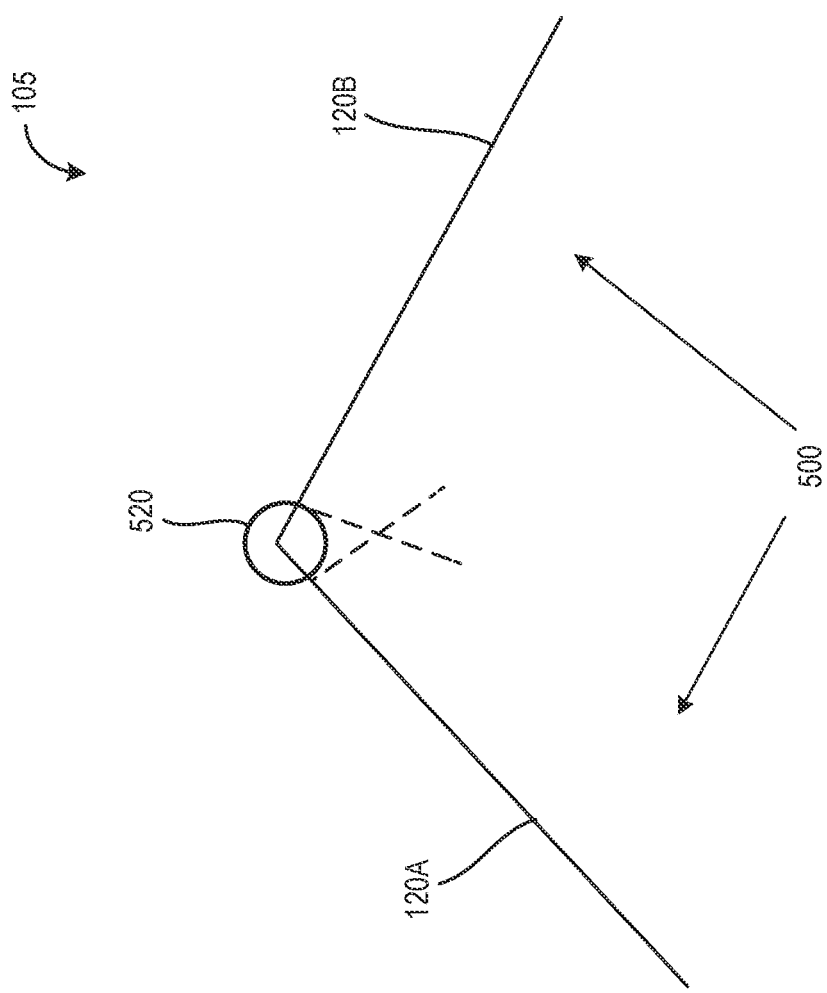

Referring now to FIG. 5C, depicted is another overhead cross-sectional view of the display panels 120 arranged in the immersive display structure 105 in the system 100 for immersive display. In some embodiments, the display panels 120 may be arranged within the immersive display structure 105 along a common edge 520 to hide or conceal the screen bezels 225 of the adjacent display panels 120 (e.g., the display panels 120A and 120B) from the interior 500. The common edge 520 may correspond to one edge of the display panel 120 (e.g., the display panel 120A) that is connected to another edge of the adjacent display panel 120 (e.g., the display panel 120B).

Referring now to FIG. 6A, depicted is a frontal view of the light relay 360 disposed in the immersive display structure 105 in the system for immersive display. As illustrated, the light relay 360 may include a set of optical fibers 600. Each optical fiber 600 may include or may be a transparent fiber to pass or direct the light from one face (e.g., the exterior face) to another face (e.g., the interior face) of the light relay 360. When mounted with the display tile 365, the optical fibers 600 of the light relay 360 may pass the output rendered by the display tile 365 from the exterior face to the interior face. In passing through, the optical fibers 600 may transform or convert the output to conform with the shape, as well as other parameters such as the aspect ratio and resolution as discussed above. Each optical fiber 600 may support a propagation mode to pass through the light. For example, the optical fibers 600 may each be single-mode fibers to transfer light in accordance with single-mode propagation or multi-mode fibers to transfer light in accordance with multi-mode propagation, among others.

The light relay 360 may be of a non-rectangular shape (e.g., triangular as depicted), corresponding to the non-rectangular facets (e.g., the triangular facet 315) to be disposed in each opening 340 of the immersive display structure 105. The light relay 360 may have a width 605 ranging between 20 to 80 inches and a height 610 ranging between 20 to 80 inches. Referring now to FIG. 6B, depicted is a side view of the light relay 360 disposed in the immersive display structure 105 in the system for immersive display. As illustrated, the light relay 360 may have a thickness 615. The thickness 615 may correspond to the length of each optical fiber 600, and may range between 1 to 5 inches. In some embodiments, the thickness 615 of the light relay 360 may correspond to the width of the display panel 120.

Figure 7:
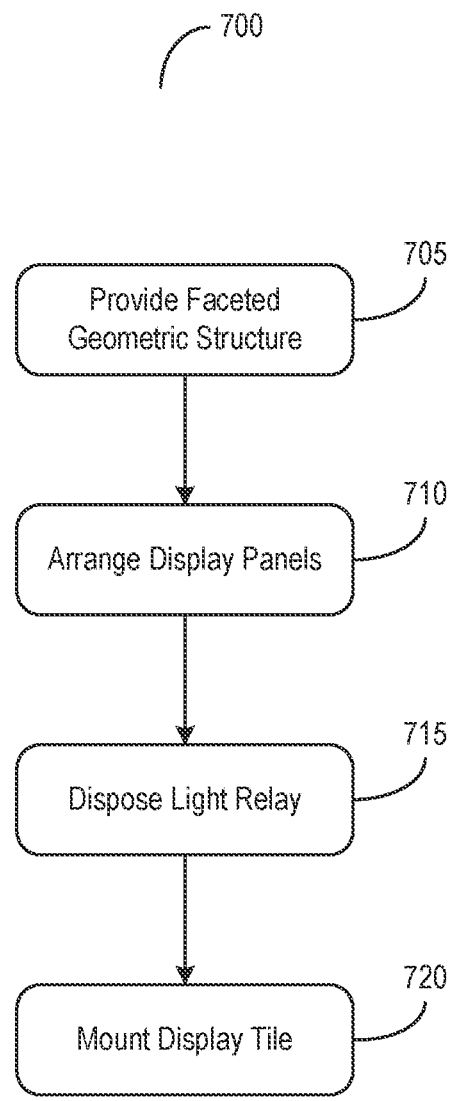
FIG. 7 illustrates a flow diagram of a method for immersive display in accordance with an illustrative embodiment.

Referring now to FIG. 7, depicted is a flow diagram of a method 700 for immersive display. The method 700 may be implemented or performed using any of the components described herein in conjunction with FIGS. 1-6B and 8. In brief overview, the method 700 may include providing a faceted geometric structure (705). The method 700 may include arranging display panels (710). The method 700 may include disposing a light relay (715). The method 700 may including mounting a display tile (720).

In further detail, the method 700 may include providing a faceted geometric structure (e.g., the immersive display structure 105) (705). The faceted geometric structure may be a set of copulae or a section of the set of copulae. For example, the copulae for the geometry of the faceted geometric structure may be a rhombicuboctahedron. The faceted geometric structure may be defined via a set of rectangular facets (e.g., the rectangular facets 310) and a set of non-rectangular facets (e.g., the triangular facets 315). The faceted geometric structure may include an axis (e.g., the vertical axis 300Y) and a plane perpendicular to the axis.

The faceted geometric structure and may be divided into one or more levels (e.g., levels 325), each along the plane.

The method 700 may include arranging display panels (e.g., the display panels 120) (710). Each display panel may receive an input from a computing device (e.g., the computing device 110) and may generate a rendering using the input to output to an interior of the faceted geometric structure. The display panels may be arranged radially about the axis. Each display panel may be of a rectangular shape, and may be situated in the rectangular facets of the structure. On at least one of the levels (e.g., the top level 325A or the bottom level 325C), the display panels may be oriented on a slope (e.g., the slope 330) to partially define an opening (e.g., the opening 340). The opening may be of a triangular shape.

The method 700 may include disposing a light relay (e.g., the light relay 360) (720). The light relay may be inserted within the opening defined by the display panels oriented at the slope in the faceted geometric structure. The light relay may have a shape corresponding to the opening, and may have a triangular shape. The light relay may be fitted or connected with the adjacent display panels of the faceted geometric shape. The light relay may be a passive optical component including a set of optical fibers (e.g., the optical fibers 600) to pass light from an exterior face to an interior face. In passing, the light relay may convert the input to take account of the differences in shapes, and may correct for aspect ratio and resolution. The light relay may produce the output for display to the interior of the faceted geometric structure.

The method 700 may including mounting a display tile (e.g., the display tile 365) (715). The display tile may be an instance of the display panel, and may be of a rectangular shape. The display tile may be mounted at or about the opening formed in the faceted geometric structure to provide the display to the interior. The display tile may be mounted or mechanically coupled with the exterior surface of the light relay. The display tile may generate a rendering to be presented to the interior of the faceted geometric structure via the light relay.

B. Computer System

Figure 8:
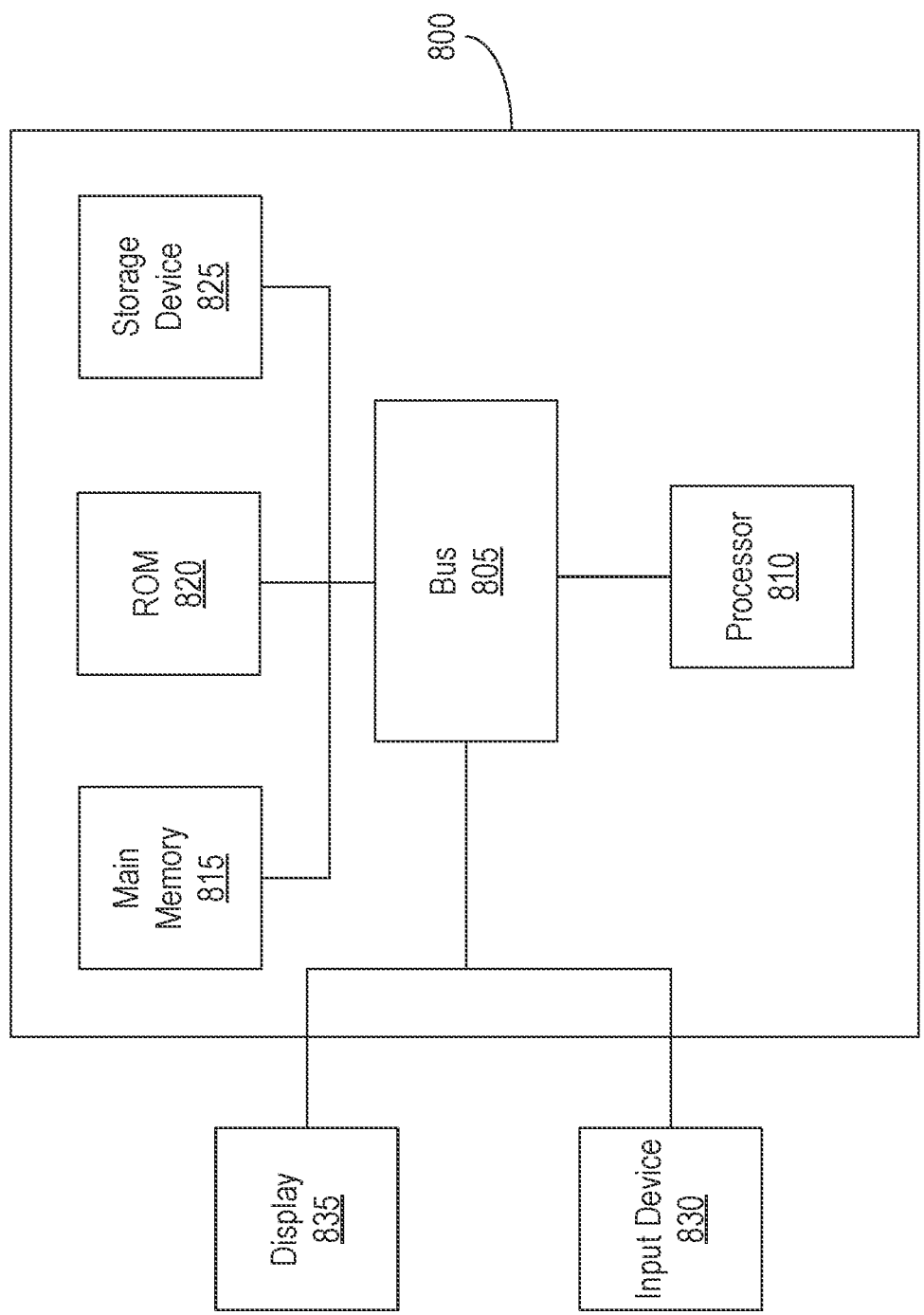
FIG. 8 illustrates a block diagram of an example computer system useful in implementing one or more components detailed herein.

Referring now to FIG. 8, depicted is a block diagram of an example computer system 800. The computer system or computing device 800 can include or be used to implement the system 100, or its components such as the computing device 110, the display panels 120, and the HMD 135. The computing system 800 includes at least one bus 805 or other communication component for communicating information and at least one processor 810 or processing circuit coupled to the bus 805 for processing information. The computing system 800 can also include one or more processors 810 or processing circuits coupled to the bus for processing information. The computing system 800 also includes at least one main memory 815, such as a random access memory (RAM) or other dynamic storage device, coupled to the bus 805 for storing information, and instructions to be executed by the processor 810. The computing system 800 may further include at least one read only memory (ROM) 820 or other static storage device coupled to the bus 805 for storing static information and instructions for the processor 810. A storage device 825, such as a solid state device, magnetic disk or optical disk, can be coupled to the bus 805 to persistently store information and instructions.

The computing system 800 may be coupled via the bus 805 to a display 835, such as a liquid crystal display, or active matrix display, for displaying information to a user such as an administrator of the data processing system. An input device 830, such as a keyboard or voice interface may be coupled to the bus 805 for communicating information and commands to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835. The display 835 can be part of the display panel 120, or other component of FIG. 1.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus for immersive display, comprising:
    a faceted geometric structure having an axis and a plane perpendicular to the axis, the faceted geometric structure comprising a level along the plane;
    a plurality of display panels arranged on the level radially about the axis and having a slope relative to the axis to define an opening of a first shape, each of the plurality of display panels having a second shape different from the first shape to render a display to an interior of the faceted geometric structure;
    a display tile having the second shape and mounted at the opening; and
    a light relay having the first shape disposed within the opening, the light relay to:
        receive a first output from the display tile corresponding to the second shape;
        convert the first output of the second shape to a second output to conform with the first shape; and
        provide the second output for the display to the interior of the faceted geometric structure.

2. The apparatus of claim 1, further comprising a second plurality of display panels that extend parallel along the axis arranged radially about the axis to at least partially enclose a second level different from the level in the faceted geometric structure, each of the second plurality of display panels having the first shape.

3. The apparatus of claim 2, wherein at least one of the second plurality of display panels is mechanically coupled with an adjacent display panel of the second plurality of display panels.

4. The apparatus of claim 2, wherein at least one of the second plurality of display panels and a diagonally adjacent display panel of the plurality of display panels partially defines the opening.

5. The apparatus of claim 2, wherein the adjacent display panel is coupled in combination with the light relay to form a diopter neutral shape.

6. The apparatus of claim 1, wherein each of the plurality of display panels comprises a curved display surface, the curved display surface having an edge to at least partially conceal a screen bezel of an adjacent display panel.

7. The apparatus of claim 1, wherein the light relay is further to correct, based on the first shape and the second shape, an aspect of the first output rendered by the display tile.

8. The apparatus of claim 1, wherein the first shape of the light relay corresponds to a shape of a first facet of the faceted geometric structure and wherein the second shape of each of the plurality of display panels corresponds to a shape of a second facet of the faceted geometric structure.

9. The apparatus of claim 1, wherein each display panel of the plurality of display panels is removably attached to a corresponding facet of the immersive display structure.

10. A system for immersive display, comprising:
a computing device having one or more processors coupled with memory,
an immersive display structure communicatively coupled with the computing device, the immersive display structure comprising:
a plurality of display panels arranged radially on a level about an axis of the immersive display structure and having a slope relative to the axis to define an opening of a first shape, each of the plurality of display panels having a second shape different from the first shape to render a display to an interior of the immersive display structure;
a display tile having the second shape and mounted at the opening; and
a light relay having the first shape disposed within the opening, the light relay to:
receive a first output from the display tile corresponding to the second shape;
convert the first output of the second shape to a second output to confirm with the first shape; and
provide the second output for the display to the interior of the immersive display structure.

11. The system of claim 10, wherein the immersive display structure further comprises a second plurality of display panels that extend parallel along the axis arranged radially about the axis to at least partially enclose a second level different from the level in the immersive display structure, each of the second plurality of display panels having the first shape.

12. The system of claim 10, wherein the plurality of display panels and the display tile is configured to maintain a vergence tolerance of a binocular head-mounted display (HMD) for augmented display.

13. The system of claim 10, wherein each of the plurality of display panels comprises a curved display surface, the curved display surface having an edge to at least partially conceal a screen bezel of an adjacent display panel.

14. The system of claim 10, wherein the light relay is further to correct, based on the first shape and the second shape, an aspect of the first output rendered by the display tile.

15. The system of claim 10, wherein the first shape of the light relay corresponds to a shape of a first facet of the faceted geometric structure and wherein the second shape of each of the plurality of display panels corresponds to a shape of a second facet of the faceted geometric structure.

16. A method for immersive display, comprising:
providing a faceted geometric structure having an axis and a plane perpendicular to the axis, the faceted geometric structure comprising a level along the plane;
arranging a plurality of display panels on the level radially about the axis and having a slope relative to the axis to define an opening of a first shape, each of the plurality of display panels having a second shape different from the first shape to render a display to an interior of the faceted geometric structure;
mounting, at the opening, a display tile having the second shape; and
disposing, within the opening, a light relay having the first shape, the light relay to:
receive a first output from the display tile corresponding to the second shape;
convert the first output of the second shape to a second output to confirm with the first shape; and
provide the second output for the display to the interior of the faceted geometric structure.

17. The method of claim 16, further comprising:
providing a second plurality of display panels that extend parallel along the axis arranged radially about the axis to at least partially enclose a second level different from the level in the faceted geometric structure, each of the second plurality of display panels having the first shape.

18. The method of claim 16, wherein each of the plurality of display panels comprises a curved display surface, the curved display surface having an edge to at least partially conceal a screen bezel of an adjacent display panel.

19. The method of claim 16, wherein the light relay is further to correct, based on the first shape and the second shape, an aspect of the first output rendered by the display tile.

20. The method of claim 16, wherein the first shape of the light relay corresponds to a shape of a first facet of the faceted geometric structure and wherein the second shape of each of the plurality of display panels corresponds to a shape of a second facet of the faceted geometric structure.

* * * * *